(12) United States Patent
Mushikabe et al.

(10) Patent No.: US 11,580,487 B2
(45) Date of Patent: Feb. 14, 2023

(54) CONTROLLER AND TERMINAL DEVICE CONTROL METHOD

(71) Applicant: YAMAHA CORPORATION, Hamamatsu (JP)

(72) Inventors: Kazuya Mushikabe, Hamamatsu (JP); Keisuke Tsukada, Hamamatsu (JP); Akihiko Suyama, Hamamatsu (JP); Shinichiro Kato, Setagaya-ku (JP)

(73) Assignee: YAMAHA CORPORATION, Hamamatsu (JP)

( * ) Notice: Subject to any disclaimer, the term of this patent is extended or adjusted under 35 U.S.C. 154(b) by 412 days.

(21) Appl. No.: 16/829,345

(22) Filed: Mar. 25, 2020

(65) Prior Publication Data
US 2020/0226541 A1 Jul. 16, 2020

Related U.S. Application Data

(63) Continuation of application No. PCT/JP2017/035909, filed on Oct. 3, 2017.

(51) Int. Cl.
*G06Q 10/0833* (2023.01)
*G06Q 10/087* (2023.01)
(Continued)

(52) U.S. Cl.
CPC ....... *G06Q 10/0833* (2013.01); *G06Q 10/087* (2013.01); *H04W 4/021* (2013.01)

(58) Field of Classification Search
CPC . G06Q 10/0833; G06Q 10/087; H04W 4/021; G06F 13/00
(Continued)

(56) References Cited

U.S. PATENT DOCUMENTS 9,832,071 B2 11/2017 Kohara
2009/0089166 A1* 4/2009 Happonen ............... H04L 67/53
705/14.55
(Continued)

FOREIGN PATENT DOCUMENTS

JP 2009075677 A 4/2009
JP 2011248432 A 12/2011
(Continued)

OTHER PUBLICATIONS

International Search Report issued in Intl. Appln. No. PCT/JP2017/035909 dated Nov. 21, 2017. English translation provided.
(Continued)

*Primary Examiner* — Garcia Ade
(74) *Attorney, Agent, or Firm* — Rossi, Kimms & McDowell LLP

(57) ABSTRACT

A controller includes at least one processor that implements the instructions to execute a plurality of tasks. The plurality of tasks includes a management table obtaining task that obtains, from the management table including first information indicating a region and second information indicating a country or a region, a destination information obtaining task that obtains third information indicating a region of a shipping destination to which the terminal device is to be shipped, a first specifying task that specifies a first function, a determining task that determines whether a second function, with reference to the second information, needs to be specified, an estimation information obtaining task that in a case where the second function is determined to be necessary, obtains estimation information corresponding to the second information from an external device, and a second specifying task that specifies the second function.

10 Claims, 7 Drawing Sheets

(51) Int. Cl.
*H04W 4/021* (2018.01)
*H04L 67/303* (2022.01)

(58) Field of Classification Search
USPC .......................................... 705/333
See application file for complete search history.

(56) References Cited

U.S. PATENT DOCUMENTS

2013/0024569 A1* 1/2013 Iwauchi ........... H04N 21/25841
709/225
2013/0073701 A1* 3/2013 Kohara ................. H04L 67/303
709/221

FOREIGN PATENT DOCUMENTS

| | | |
|---|---|---|
| JP | 2012216075 A | 11/2012 |
| JP | 2013115545 A | 6/2013 |
| JP | 2016110644 A | 6/2016 |

OTHER PUBLICATIONS

Written Opinion issued in Intl. Appln. No. PCT/JP2017/035909 dated Nov. 21, 2017.
Supplementary European Search Report issued in European Appln. No. 17927851.0 dated May 20, 2021.

* cited by examiner

FIG. 4

| Function | Available Destinations | Available Countries |
|---|---|---|
| Voice Control Service | A | |
| User registration | A | US |
| Streaming Service X | A,B | US,DE,FR |
| Streaming Service Y | B | |
| Streaming Service Z | A,B,C | |

CONTROLLER AND TERMINAL DEVICE CONTROL METHOD

CROSS REFERENCE TO RELATED APPLICATIONS

The present application is a continuation of International Application No. PCT/JP2017/035909, filed on Oct. 3, 2017, the entire contents of which are incorporated herein by reference.

TECHNICAL FIELD

Some preferred embodiments of the present invention relate to a controller and a terminal device control method.

BACKGROUND ART

A device may need a different function, depending on a destination (a country or a region to which the device is shipped) of a product.

For example, Patent Literature 1 discloses the following content. First, a device requests an application list screen together with information on a country or a region in which the device is used, to a server. The server specifies an application associated with destination information and transmits list information on applications available in the country or the region in which the device is used, to the device.

Patent Literature 2 discloses the following content. First, a device is automatically connected to a network after the device is installed. The device estimates a region, based on information obtained from a specific server. The device reads initial setting screen information of the region from a storage portion, and displays the information, on a display portion.

Patent Literature 3 discloses the following content. A device obtains destination information stored in a storage portion at startup, and creates WEB screen information of a user terminal by a language used in the destination information.

CITATION LIST

Patent Literature

Patent Literature 1: Japanese Unexamined Patent Application Publication No. 2016-110644
Patent Literature 2: Japanese Unexamined Patent Application Publication No. 2012-216075
Patent Literature 3: Japanese Unexamined Patent Application Publication No. 2009-75677

SUMMARY OF THE INVENTION

Technical Problem

Patent Literature 1 does not disclose how to obtain the destination information. Patent Literature 3 is not able to be adapted to a case in which an actual installation site is different from a destination place stored in the storage portion.

In addition, the techniques of Patent Literature 1 and Patent Literature 3 are not able to support a case in which the destination place indicates a wide area such as "Europe," for example, that is, a case in which a different function is required for each of more detailed countries or regions. For example, even in the same North American region, services available for each country may be different.

On the other hand, the technique of Patent Literature 2 needs to communicate with a server in order to estimate a detailed country or region. The server, since receiving communications from a large number of devices in the whole world, receives a large load. Moreover, in a case of obtaining information on a country or a region through a paid service, as the number of products is increased and thus the communication frequency is increased, the cost is increased.

In view of the foregoing, various preferred embodiments of the present invention are directed to provide a controller that is adapted to a case in which a different function is required for each of detailed countries or regions and that reduces frequency of communication to a server, and a terminal device control method.

Solution to Problem

The controller for controlling a function to be used by a terminal device, the controller according to various preferred embodiments of the present invention includes a communication interface configured to communicate with the terminal device, at least one memory storing instructions and a management table for controlling the terminal device, and at least one processor that implements the instructions to execute a plurality of tasks. The plurality of tasks includes a management table obtaining task that obtains, from the management table including first information indicating a region and second information, which is associated with the first information, indicating a country or a region and including more details than the first information, a destination information obtaining task that obtains, from the terminal device, third information indicating a region of a shipping destination to which the terminal device is to be shipped, a first specifying task that specifies a first function, based on the management table and the obtained third information, a determining task that determines whether a second function, with reference to the second information corresponding to the specified first function, needs to be specified, an estimation information obtaining task that in a case where the second function is determined to be necessary, obtains estimation information corresponding to the second information from an external device, and a second specifying task that specifies the second function, based on the management table and the obtained estimation information.

Advantageous Effects of the Invention

Various preferred embodiments of the present invention are adapted to a case in which a different function is required for each of detailed countries or regions and are able to reduce frequency of communication to a server.

BRIEF DESCRIPTION OF DRAWINGS

FIG. 4 is a diagram showing an example of a management table.

DETAILED DESCRIPTION OF PREFERRED EMBODIMENTS

Figure 1:
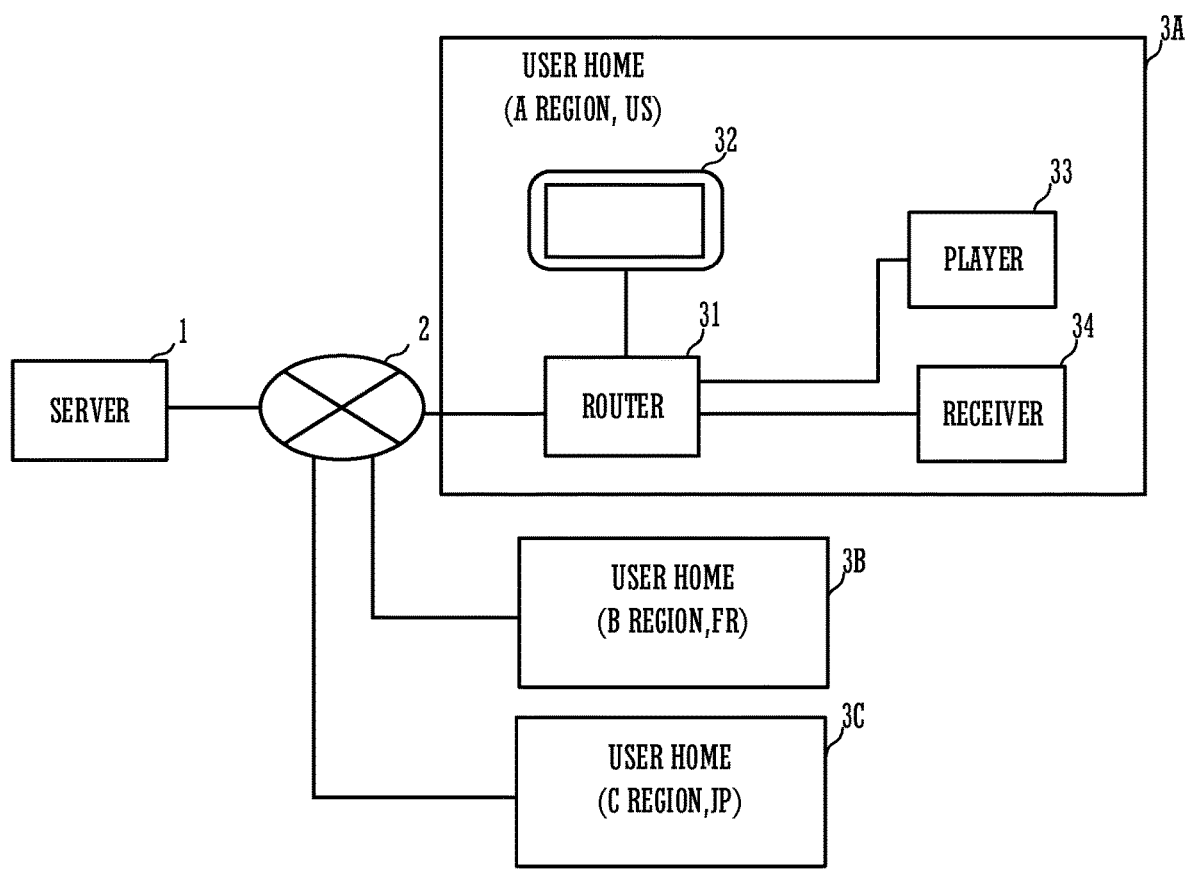
FIG. 1 is a block diagram showing a configuration of an information processing system.

FIG. 1 is a block diagram showing a configuration of an information processing system according to a preferred embodiment of the present invention. The information processing system includes a server 1, the Internet 2, and a router 31, a controller 32, a player 33, and a receiver 34 that are installed in a user home 3A.

The user home 3A, as an example, is in US (the United States of America) of an A region (North American region). A user home 3B, as an example, is in FR (French Republic) of a B region (European region). A user home 3C, as an example, is in JP (Japan) of a C region (Asian region).

The player 33 and the receiver 34 each are examples of a terminal device. While FIG. 1 shows an example in which the player 33 and the receiver 34 are installed in user home 3A, a terminal device is also in other user home 3B and user home 3C. In practice, a greater number of terminal devices are distributed as products and installed in each user home.

The controller 32 is an example of an information processing device. In the present preferred embodiment, as an example, the controller 32 includes a smartphone.

The server 1, for example, is installed at a manufacturer being a shipping source of a terminal device or at an agent who provides a dedicated service. The server 1 has a function to estimate a country or a region in which the terminal device is used. For example, the server 1 receives a global IP address from a client (the terminal device or the controller). The server 1 stores a table in which the global IP address and information (estimation information) on a country or a region are associated with each other. The server 1 estimates a corresponding country or region according to the information on the global IP address received from the client, and sends estimation information back.

Figure 2:
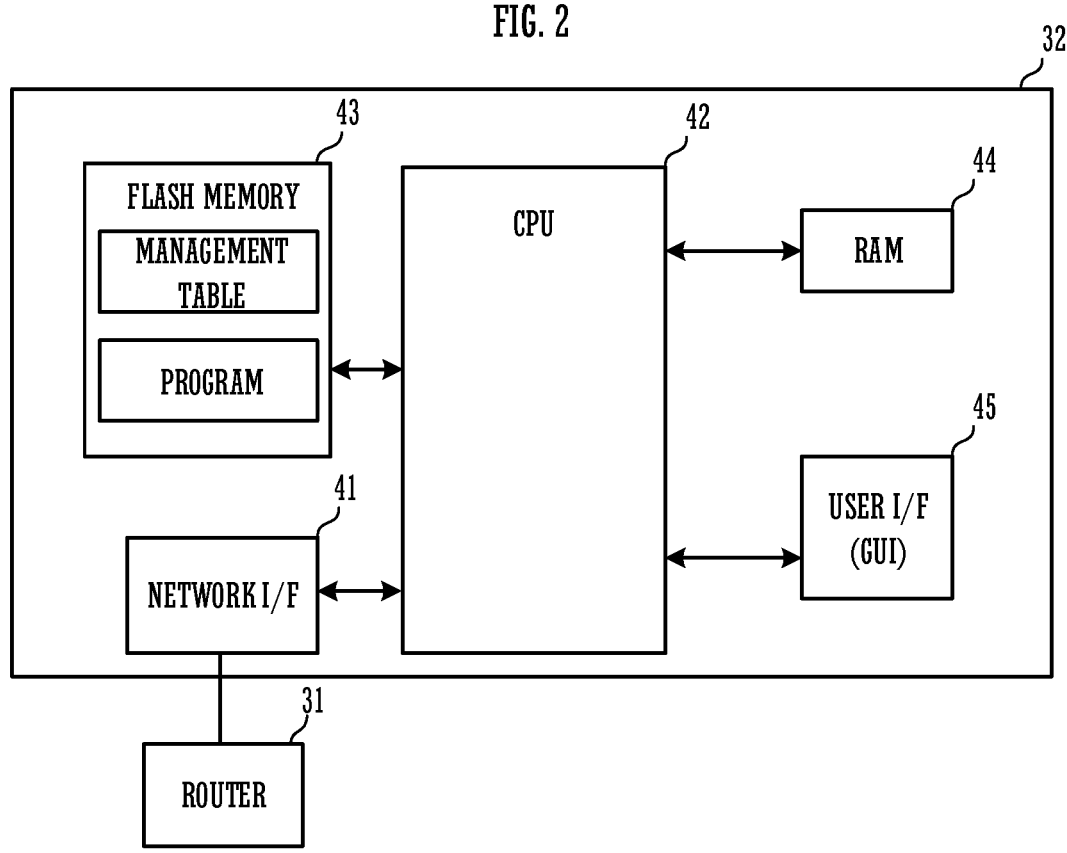
FIG. 2 is a block diagram showing a main configuration of a controller.
Figure 3:
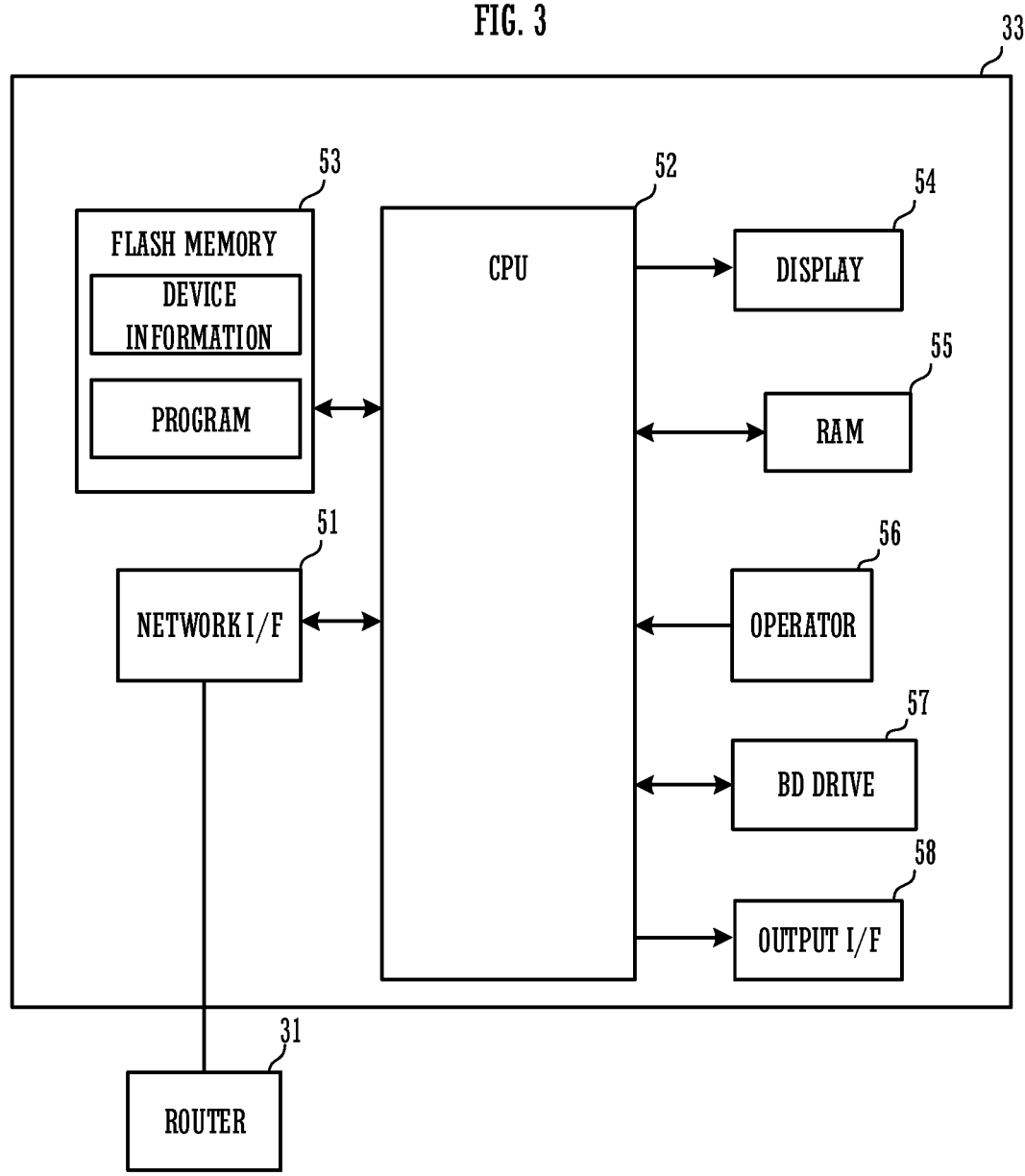
FIG. 3 is a block diagram showing a main configuration of a player.

FIG. 2 is a block diagram showing a main configuration of the controller 32. FIG. 3 is a block diagram showing a main configuration of the player 33.

As shown in FIG. 2, the controller 32 includes a network interface (I/F) 41, a CPU 42, a flash memory 43, a RAM 44, and a user I/F (a GUI) 45.

The flash memory 43 being a storage medium stores a program for operating the controller 32, and a management table. The CPU 42 reads the program stored in the flash memory 43 to the RAM 44 and performs various operations. For example, the controller 32 communicates with the player 33 being a terminal device, and controls various functions in the terminal device.

As shown in FIG. 2, the player 33 includes a network I/F 51, a CPU 52, a flash memory 53, a display 54, a RAM 55, an operator 56, a BD (Blu-ray (registered trademark) Disc) drive 57, and an output I/F 58. Although this example shows a configuration including the BD drive 57 to read content from a BD medium as an example of a player, the player 33 may read content from another medium. In addition, the player 33 may have a function to read content from another device through a network. It is to be noted that, while FIG. 3 shows the configuration of the player 33 as a representative of a terminal device, the main configuration of other terminal devices does not significantly change.

The flash memory 53 stores firmware and device information. The device information includes destination information (third information) indicating a shipping destination of a terminal device, functional information indicating a function that the terminal device has, or identification information of the terminal device.

The firmware stores various application programs, language information, a GUI display image, or the like. The CPU 52 reads the firmware stored in the flash memory 53 to the RAM 55 and performs various operations. For example, the CPU 52 receives an input of an operation signal according to an operation of a user, from the operator 56, and operates according to the operation of a user. For example, the CPU 52 reads content data from a BD inserted in the BD drive 57, performs reproduction processing, and outputs a video signal or an audio signal to the output I/F 58. In addition, the CPU 52 communicates with the controller 32, and transmits and receives a variety of information.

FIG. 4 is a diagram showing an example of the management table. The management table is a table in which a function (Function) column, a region (Available Destinations) column, and a country/region (Available Countries) column are associated with one another.

The function column indicates an available function in the terminal device. The region column indicates regional information (first information), that is, a shipping destination of the terminal device. The regional information corresponds to destination information in the device information. The regional information is information including a plurality of countries or regions. The country/region column indicates a region or a country more detailed than the region column, and corresponds to the second information of the present invention.

The management table is stored in the flash memory 43. The CPU 42, when reading an operating program to the RAM 44, reads the management table from the flash memory 43 to the RAM 44. In this manner, the CPU 42 executes the management table obtaining processing to obtain a management table. It is to be noted that the management table may be stored in the flash memory 43 together with the operating program, and may be updated together with the operating program at the time of an update. It is to be noted that the management table may be stored in a memory of a terminal device such as the player 33. In such a case, the controller 32 obtains the management table from the terminal device. Alternatively, the controller 32 may store the management table in a server and obtain from the server when necessary.

The controller 32, by using an obtained management table, specifies a function available in the terminal device. The terminal device may need a different function, depending on a country or a region in which the terminal device is used. For example, the example of the management table shown in FIG. 4, as a function available only in the North American region, shows voice control service (Voice Control Service). In addition, for example, as a function used only in the United States of America, a user registration function (User registration) to transmit user information to a specific server and to register the user information in the specific server is shown. In addition, a streaming service of content, in the North American region and the Europe region, also includes a service (Streaming Service X) available in more specific countries (the United States of America, Federal Republic of Germany, and the French Republic), a service (Streaming Service Y) available across Europe, and a service (Streaming Service Z) available in the whole world.

For example, the voice control service is available in all countries of the North American region in which the language is common. However, a user registration function, due to a legal requirement, is available only in the United States of America even within the same North American region. In addition, in an example other than FIG. 4, even the same Asian region, for example, in viewing and listening of specific content, includes a country that imposes age restrictions and a country that does not impose age restrictions, and may need a different content distribution service for each country even in the same Asian region.

Therefore, in the terminal device, it is necessary to specify not only a destination place but also a more detailed country or region and to specify an available function in more detail. However, if all terminal devices obtain estimation information using the server 1, the server 1, since receiving communications from a large number of devices in the whole world, receives a large load.

Thus, the controller 32 obtains a management table and obtains information on a region in which the terminal device is used. In other words, the controller 32 performs the destination information obtaining processing. Then, the controller 32 specifies a function available in the terminal device by using such information. In other words, the controller performs the first specifying processing. Then, the controller 32, when determining that it is necessary to more precisely specify an available function for each country or region, obtains estimation information from the server 1. In other words, the controller 32 performs the estimation information obtaining processing. Then, the controller 32 specifies an available function by using the estimation information. In other words, the controller 32 performs the second specifying processing.

Figure 5:
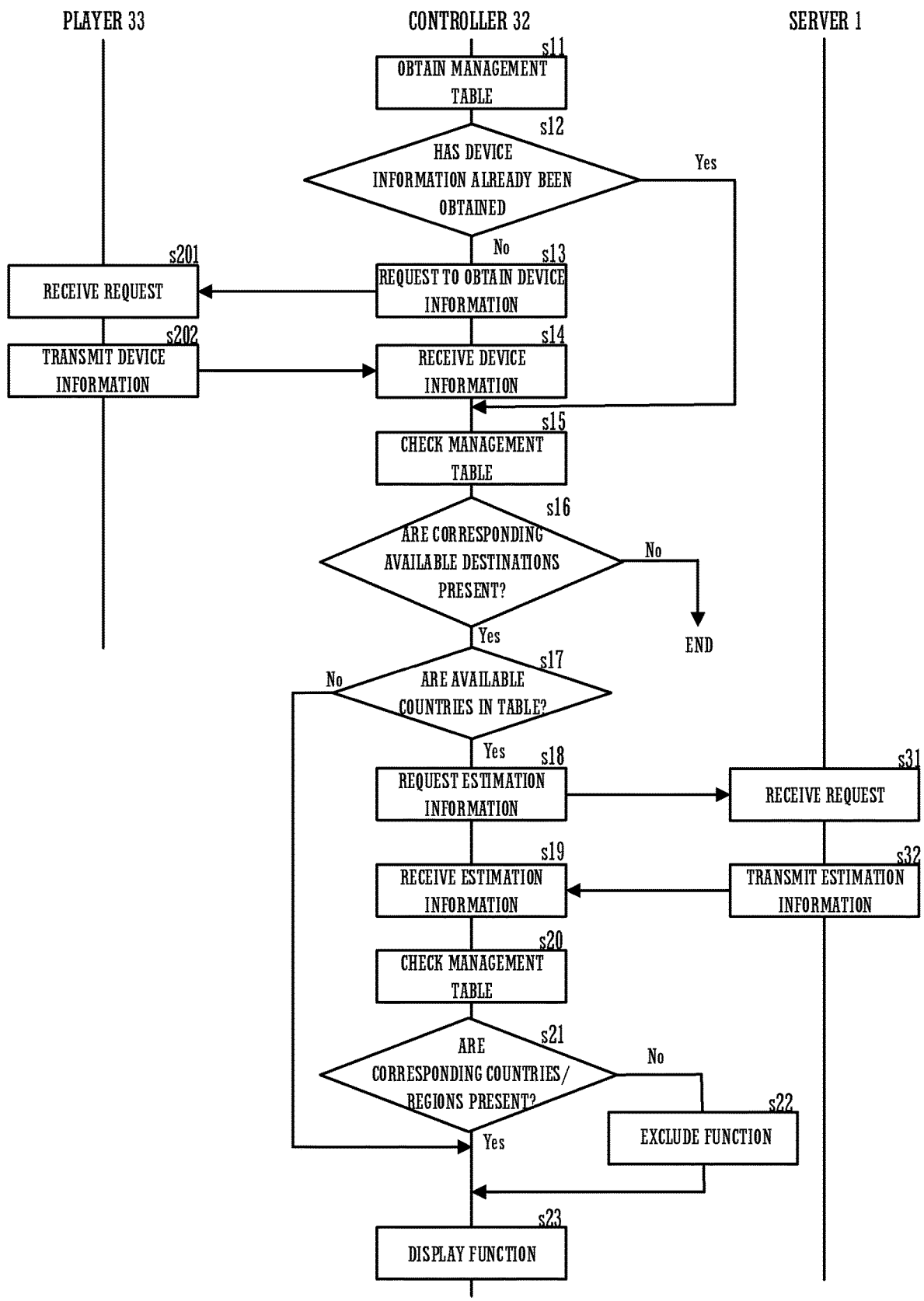
FIG. 5 is a flow chart showing an operation of each device.

FIG. 5 is a flow chart showing an operation of the controller 32, the player 33, and the server 1. When a user operates the user I/F 45 of the controller 32 and starts an application program according to the present preferred embodiment, the controller 32 first reads a management table stored in the flash memory 43 to the RAM 44, and obtains the management table (s11). It is to be noted that, before the operations shown in the flow chart of FIG. 5 are performed, a connection between the controller 32 and the terminal device (the player 33 in this example) is established through the network. In a case in which the management table is stored in the player 33, the controller 32 obtains the management table transmitted from the player 33.

Subsequently, the controller 32 determines whether the device information has been obtained from the player 33 (s12). The device information includes destination information, functional information, or identification information, for example. The controller 32, in a case of obtaining no device information, makes a request to obtain the device information (s13), to the player 33. The player 33 receives the request (s201), and transmits the device information to the controller (s202). The controller 32 receives the device information (s14). Such a series of processing steps corresponds to the destination information obtaining processing.

The controller 32, in a case of obtaining the device information, checks the device information and the management table (s15). In other words, the controller 32 determines whether the region (the A region, the B region, or the C region) corresponding to the destination information included in the device information is described in the region (Available Destinations) column of the management table (s16).

The controller 32 specifies a function in which a region corresponding to a destination information is described in the region column as an available function. For example, in the management table of FIG. 4, when the destination information indicates the C region, the controller 32 specifies the streaming service Z as an available function. Accordingly, the determination of s16 corresponds to the first specifying processing to specify an available function, based on the management table and the destination information.

The controller 32 ends the operation in a case in which the region corresponding to the destination information does not have a function described in the region column of the management table (s16 to END). The controller 32 further determines whether the function about which the region corresponding to the destination information is described in the region column of the management table is described in the country/region column, referring to the country/region (Available Countries) column (s17). This determination corresponds to the determination processing to refer to the country/region information corresponding to a specified function and determine whether the second specifying processing more detailed than the first specifying processing is necessary.

The controller 32, when no description is in the country/region column, determines the function corresponding to the destination information included in the device information. For example, in the management table of FIG. 4, when the destination information included in the device information indicates the C region, the streaming service Z is determined. The controller 32 displays a determined function on a display (the GUI of the user I/F 45) (s23). As a result, for example, as shown in FIG. 6D, in the controller 32, only the streaming service Z is displayed. Therefore, the user can determine that the function available in the player 33 is the streaming service Z.

On the other hand, the controller 32, when a description is in the country/region column, requests estimation information, to the server 1 (s18). For example, in the management table of FIG. 4, when the destination information included in the device information indicates the A region or the C region, the controller 32 requests estimation information. The controller 32 makes a request by notifying an IP address to the server 1. The server 1 receives the request (s31). The server 1, for example, stores a table in which an IP address and information (hereinafter, referred to as regional information) on a country or a region are associated with each other. The server 1 refers to a country or a region corresponding to a received IP address and sends a reply as estimation information (s32).

The controller 32 receives the estimation information (s19). Such processing corresponds to the estimation information obtaining processing. The controller 32 checks received estimation information and the management table (s20). Then, the controller 32 determines whether a description corresponding to the received estimation information is in the country/region column of the management table (s21). This determination corresponds to the second specifying processing to specify a function available in the terminal device based on the management table and the estimation information obtained in the estimation information obtaining processing.

The controller 32, when a description corresponding to the received estimation information is in the country/region column of the management table, determines the corresponding function. For example, in the management table of FIG. 4, when the description indicates the B region and the estimation information is FR (French Republic), the streaming service X is determined as the corresponding function. The controller 32 displays a determined function on a display (the GUI of the user I/F 45) (s23). In such a case, as shown in FIG. 6B, in the controller 32, the streaming service X, the streaming service Y, and the streaming service Z are displayed.

On the other hand, the controller 32, when a description corresponding to the received estimation information is not in the country/region column of the management table, excludes the corresponding function (s22). For example, in the management table of FIG. 4, when the description indicates the B region and the estimation information is GB (the United Kingdom), the streaming service X is excluded as the corresponding function. In such a case, as an available function, the streaming service Y and the streaming service Z are determined. The controller 32 displays a determined function on a display (the GUI of the user I/F 45) (s23). In such a case, as shown in FIG. 6C, in the controller 32, the streaming service Y and the streaming service Z are displayed.

Figure 6A:
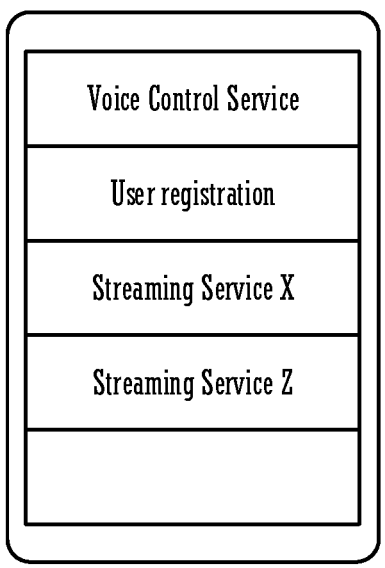
FIG. 6A, FIG. 6B, FIG. 6C, and FIG. 6D are diagrams showing a display example of a function.
Figure 6B:
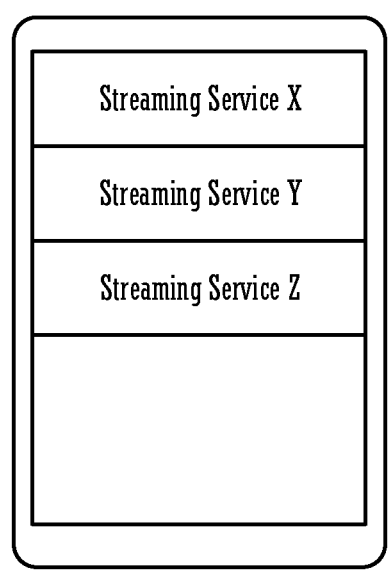
Figure 6C:
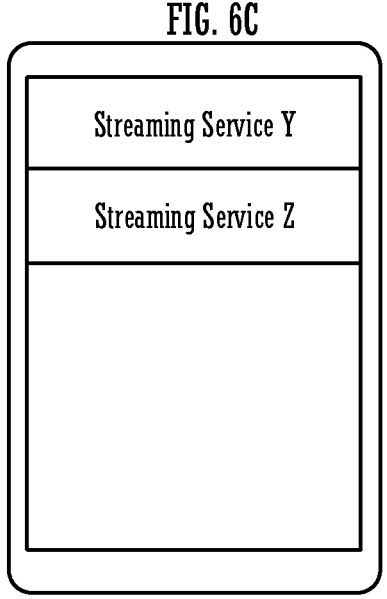
Figure 6D:
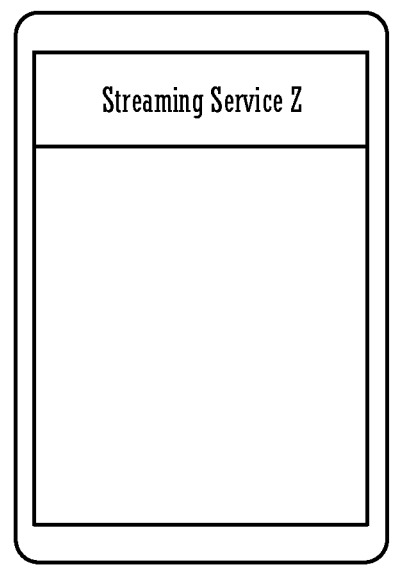

It is to be noted that, FIG. 6A shows an example of displaying the voice control service, user registration, the streaming service X, and the streaming service Z. As described above, the controller 32 according to the present preferred embodiment first uses the destination information and specifies (performs the first specifying processing) a function available in the terminal device. Then, the controller 32, only when determining that it is necessary to more precisely specify an available function for each country or region, obtains (performs the estimation information obtaining processing) estimation information from the server 1. Then, the controller specifies (performs the second specifying processing) an available function by using the estimation information. As a result, the controller 32 is adapted to a case in which a different function is required for each of detailed countries or regions and is able to reduce frequency of communication to a server 1.

It is to be noted that, when a terminal device is taken out to another country, the destination information and an actual installation site do not correspond to each other. In such a case, the controller 32 determines an available function based on the result of the second specifying processing. For example, in the example of the management table shown in FIG. 4, in a case in which the player 33 purchased in the United States of America is taken out to Japan and is used, the destination information is the A region, so that the estimation information obtaining processing is performed. However, the estimation information indicates Japan, and the user registration function and the streaming service X are excluded. Therefore, in such a case, in the controller 32, the voice control service and the streaming service Z are determined as available functions.

It is to be noted that the present preferred embodiment shows an example in which the controller 32 is a smartphone and the controller 32 performs various types of processing. However, the function of the controller may be stored in terminal information. In such a case, a terminal device performs the various types of processing of the controller 32 shown in FIG. 5.

In addition, it is not essential that the controller 32 and the terminal device are connected in the network. The controller 32 and the terminal device, for example, may use wired communication such as USB or near field wireless communication such as Bluetooth (registered trademark).

In addition, the example of FIG. 5 shows that available functions are specified and then a list of the functions is displayed in the controller 32. However, the controller 32, for example, may perform processing as shown in FIG. 7.

Figure 7:
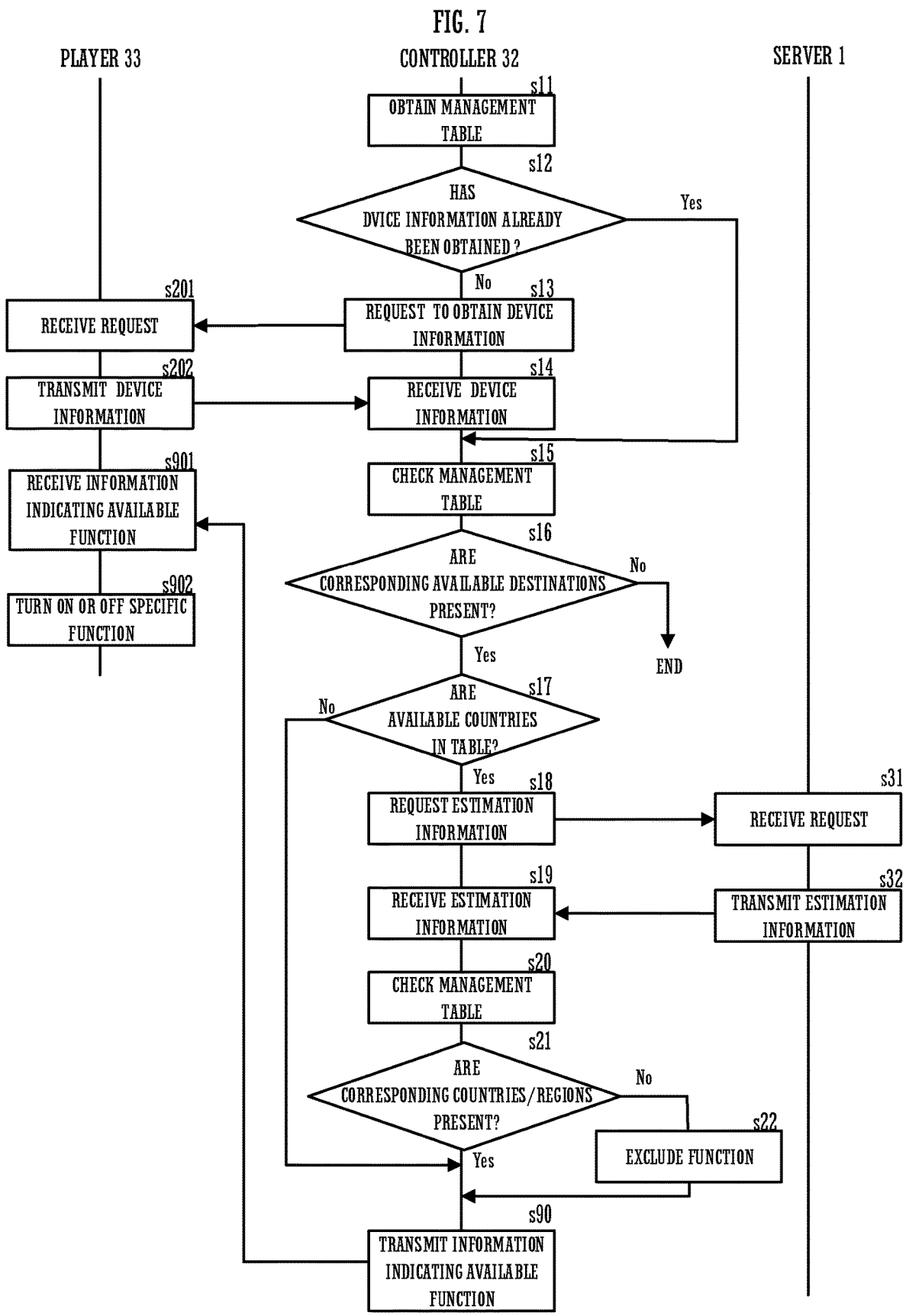
FIG. 7 is a flow chart showing an operation of each device according to a modification example.

In the flow chart of FIG. 7, the controller 32, instead of the processing of s23, transmits information indicating an available function to the player 33 (s90). The player 33 receives the information indicating an available function (s901). The player 33 turns ON (or turns OFF an unavailable function) a corresponding function, based on received information indicating an available function (s902).

In this manner, in the configuration according to the present preferred embodiment, a specific function is also able to be turned ON or OFF automatically.

In addition, the present preferred embodiment, as an example of a function, shows the voice control service, the user registration function, and the streaming service. The user registration function corresponds to a function to obtain user information and transmit to a server. This user registration function includes a function to specify a connection destination (a connection destination of a server) to be connected through a network. The configuration according to the present preferred embodiment is useful, as described above, in a case in which even the same region, in viewing and listening of specific content, includes a country that imposes age restrictions and a country that does not impose age restrictions, and may need a different content distribution service for each country.

It is to be noted that the controller 32 may specify a function available in another terminal device by using estimation information obtained with respect to one terminal device. In the example of FIG. 1, the controller 32, while obtaining the estimation information of the player 33 and specifying a function available in the player 33, may specify a function available in the receiver 34 by using the estimation information of this player 33. As a result, it is unnecessary to obtain estimation information for each terminal device, so that the frequency of communication to the server 1 is able to be further reduced.

Finally, the present preferred embodiment is illustrative in all points and should not be construed to limit the present invention. The scope of the present invention is defined not by the foregoing preferred embodiment but by the following claims. Further, the scope of the present invention is intended to include all modifications within the scopes of the claims and within the meanings and scopes of equivalents.

The invention claimed is:

1. A controller for controlling a function to be used by a terminal device, the controller comprising:
   a user interface including a display;
   a communication interface configured to communicate with the terminal device via a network, the terminal device provided with at least a first function and a second function;
   at least one memory storing instructions and a management table for controlling the terminal device; and
   at least one processor that implements the instructions to execute a plurality of tasks, including:
      a management table obtaining task that obtains, from the management table:
         first information indicating whether at least the first function is available in at least one region; and
         second information, which is associated with the first information, indicating whether at least the second function is available in at least one country in the at least one region, and including more details than the first information;
      a destination information obtaining task that obtains, from the terminal device via the network, third information indicating a destination region where the terminal device is to be used;

a first determining task that a determines whether the first function is usable in the destination region, based on the management table and the obtained third information;

a second determining task that determines whether the second function, with reference to the second information, is required in the destination region to use the first function in the destination region;

an estimation information obtaining task that in a state where the second function is determined to be required in the destination region, obtains estimation information corresponding to the second information from an external device via the network;

a third determining task that determines whether the second function is actually required to use the first function in the destination region, based on the management table and the obtained estimation information, in the state where the second function is determined to be required in the destination region; and one of, in a state where the third determining task determines that the second function is actually required to use the first function in the destination region:
- a displaying task that displays the second function in the display; or
- a transmitting task that transmits to the terminal device, via the network, indicating that the second function is available for use in the destination region.

2. The controller according to claim 1, wherein the first information includes a plurality of countries or regions.

3. The controller according to claim 1, wherein the estimation information obtaining task uses the obtained estimation information to specify a function available in another terminal device that is different from the terminal device.

4. The controller according to claim 1, wherein:
the external device is a server, and
the function to be used by the terminal device includes a function that obtains user information and transmits the user information to the server.

5. The controller according to claim 4, wherein the server is determined based on the obtained estimation information.

6. A terminal device control method using a processor, a user interface including a display, and a communication interface configured to communicate with a terminal device via a network for controlling a function to be used by the terminal device, which is provided with at least a first function and a second function, the terminal device control method comprising:

obtaining from a stored management table for controlling the function to be used by the terminal device:
first information indicating whether at least the first function is available in at least one region; and
second information, which is associated with the first information, indicating whether at least the first function is available in at least one country in the at least one region, and including more details than the first information;

obtaining, from the terminal device via the network, third information indicating a destination region where the terminal device is to be used;

determining whether the first function is usable in the destination region, based on the management table and the obtained third information;

determining whether the second function, with reference to second information, is required in the destination region to use the first function in the destination region;

obtaining, in a state where the second function is determined to be required in the destination region, estimation information corresponding to the second information from an external device via the network; and determining whether the second function is actually required to use the first function in the destination region, based on the management table and the obtained estimation information, in the state where the second function is determined to be required in the destination region; and one of, in a state where the third determining task determines that the second function is actually required to use the first function in the destination region:
a displaying task that displays the second function in the display; or
a transmitting task that transmits to the terminal device, via the network, indicating that the second function is available for use in the destination region.

7. The terminal device control method according to claim 6, wherein the first information includes a plurality of countries or regions.

8. The terminal device control method according to claim 6, wherein the obtaining of the estimation information uses the obtained estimation information to specify a function available in another terminal device which is different from the terminal device.

9. The terminal device control method according to claim 6, wherein:
the external device is a server; and
the function to be used by the terminal device includes a function that obtains user information and transmits the user information to the server.

10. The terminal device control method according to claim 9, wherein the server is determined based on the obtained estimation information.

* * * * *